(12) United States Patent
Gemme (10) Patent No.: US 11,668,203 B2
(45) Date of Patent: Jun. 6, 2023

(54) TURBINE RIM SEAL WITH LIP

(71) Applicant: PRATT & WHITNEY CANADA CORP., Longueuil (CA)

(72) Inventor: Francis Gemme, Ste-Julie (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/370,687

(22) Filed: Jul. 8, 2021

(65) Prior Publication Data

US 2023/0010337 A1  Jan. 12, 2023

(51) Int. Cl.
*F01D 11/02* (2006.01)
*F01D 11/00* (2006.01)
*F01D 11/08* (2006.01)

(52) U.S. Cl.
CPC ............ *F01D 11/001* (2013.01); *F01D 11/02* (2013.01); *F01D 11/08* (2013.01); *F05D 2230/21* (2013.01); *F05D 2240/55* (2013.01)

(58) Field of Classification Search
CPC ........ F01D 11/001; F01D 11/02; F01D 11/08; F05D 2240/55
See application file for complete search history.

(56) References Cited

U.S. PATENT DOCUMENTS

| | | | | |
|---|---|---|---|---|
| 7,540,709 B1* | 6/2009 | Ebert | .................... | F04D 29/083 |
| | | | | 415/173.7 |
| 8,419,356 B2 | 4/2013 | Little | | |
| 9,039,357 B2 | 5/2015 | Lee | | |
| 9,938,843 B2* | 4/2018 | Li | .......................... | F01D 11/001 |
| 9,938,847 B2* | 4/2018 | Li | ............................ | F01D 11/08 |
| 10,443,422 B2* | 10/2019 | Ratzlaff | .................. | F01D 11/04 |
| 10,570,767 B2* | 2/2020 | Ratzlaff | .................. | F01D 5/082 |
| 10,815,808 B2 | 10/2020 | Chouhan et al. | | |
| 2015/0330242 A1* | 11/2015 | Li | ......................... | F01D 11/001 |
| | | | | 415/173.1 |
| 2015/0354391 A1* | 12/2015 | Li | ........................... | F01D 11/08 |
| | | | | 415/173.1 |
| 2016/0017741 A1* | 1/2016 | Ebert | ...................... | F01D 11/02 |
| | | | | 415/173.7 |

(Continued)

FOREIGN PATENT DOCUMENTS

JP  2010077868 A  4/2010

OTHER PUBLICATIONS

European Search Report issued in counterpart application No. 22183362.7 dated Oct. 13, 2022.

*Primary Examiner* — Eldon T Brockman
(74) *Attorney, Agent, or Firm* — Norton Rose Fulbright Canada LLP.

(57) ABSTRACT

A turbine section has: a rotor rotatable about a central axis, the rotor having blades each protruding radially outwardly from a platform relative to the central axis; a stator having vanes each protruding radially outwardly from a shroud; a rim seal between the platform and the shroud, the rim seal having: an axial overlap between the platform and the shroud, and a lip protruding in a direction having a radial component relative to the central axis from one of the platform and the shroud toward the other of the platform and the shroud, the lip axially overlapping the other of the platform and the shroud, the lip having a radial height such that a radial gap remains between the lip and the other of the platform and the shroud when the turbine section is in operation.

13 Claims, 5 Drawing Sheets

(56) References Cited

U.S. PATENT DOCUMENTS

2017/0226882 A1\* 8/2017 Ratzlaff .................. F01D 11/04
2017/0226884 A1\* 8/2017 Ratzlaff .................. F01D 11/04
2020/0355086 A1 11/2020 Camillier \* cited by examiner

TURBINE RIM SEAL WITH LIP

TECHNICAL FIELD

The application relates generally to aircraft engines and turbine generators and, more particularly, to a rim seal between a rotor and a stator of a turbine section of such engines and generators.

BACKGROUND OF THE ART

A turbine section of a gas turbine engine generally has a plurality of stators and rotors in sequential disposition along a rotational axis. The rotating elements, such as turbine rotors, operate at a very high rotation speed, and are mounted adjacent to and/or between non-rotating structures, such as stators, within the engine. These non-rotating structures are designed to be as close as possible to the rotating blade platforms, in order to mitigate pressurized gas from flowing out an annular gas path of the gas turbine engine into undesired locations such as bearing cavities or other components not designed to sustain high temperatures. Typically, a rim seal arrangement is provided between the blade platforms of the rotor and the adjacent non-rotating structure in order to further limit losses from the main gas path. Dimensioning these rim seals may be a complicated task and may be difficult to modify after the different parts have been casted. Hence, improvements are sought.

SUMMARY

In one aspect, there is provided a turbine section comprising: a rotor rotatable about a central axis, the rotor having blades each protruding radially outwardly from a platform relative to the central axis; a stator having vanes each protruding radially outwardly from a shroud; a rim seal between the platform and the shroud, the rim seal having: an axial overlap between the platform and the shroud, and a lip protruding in a direction having a radial component relative to the central axis from one of the platform and the shroud toward the other of the platform and the shroud, the lip axially overlapping the other of the platform and the shroud, the lip having a radial height such that a radial gap remains between the lip and the other of the platform and the shroud when the turbine section is in operation.

The turbine section may include any of the following features, in any combinations.

In some embodiments, the lip has a face oriented radially toward the other of the platform and the shroud, the face being a machined surface having a surface roughness of less than that of a surface of the blades.

In some embodiments, the lip includes a base section protruding from the one of the platform and the shroud and a tip section protruding from the base section to a tip of the lip, an axial width of the tip section being constant from an end of the base section to the tip of the lip.

In some embodiments, the end of the base section is axially aligned with the tip of the lip.

In some embodiments, the tip of the lip defines an annular face facing a direction having a radial component relative to the central axis, the annular face parallel to a face of the other of the platform and the shroud.

In some embodiments, the one of the platform and the shroud defines an axial end face perpendicular to the annular face of the lip.

In some embodiments, the lip is free of an abradable material.

In some embodiments, the lip protrudes from a distal end of the one of the platform and the shroud.

In some embodiments, the one of the platform and the shroud is the shroud, the lip defined by the shroud.

In some embodiments, the lip is located downstream of a trailing edge of an airfoil protruding from the one of the platform and the shroud, the lip protruding radially inwardly from the one of the platform and the shroud.

In some embodiments, the lip is axially offset from the trailing edge relative to the central axis.

In some embodiments, the lip is located upstream of a leading edge of the one of the platform and the shroud, the lip protruding radially outwardly from the one of the platform and the shroud.

In some embodiments, the lip is axially offset from the leading edge relative to the central axis.

In some embodiments, the one of the platform and the shroud includes a second lip, the lip and the second lip located respectively downstream and upstream of an airfoil protruding from the one of the platform and the shroud.

In another aspect, there is provided a method of manufacturing a blade or a vane of a turbine section of a gas turbine engine, comprising: casting the blade or the vane to obtain a casted blade or a casted vane, the casted blade or the casted vane having an airfoil protruding from a platform or a shroud; and machining a lip of the platform or the shroud to obtain a radial gap between a tip of the lip and a shroud or a platform of an adjacent vane or blade, the lip extending in a direction having a radial component relative to a central axis of the gas turbine engine.

The method may include any of the following features, in any combinations.

In some embodiments, the casted blade or the casted vane is machined to define the lip.

In some embodiments, the machining of the lip includes determining an optimal dimension of a radial height of the gap and decreasing the radial height of the lip until the gap has the optimal dimension.

In some embodiments, the determining of the optimal dimension of the radial height of the gap includes numerically simulating thermal-induced deformations and stress-induced deformations of the blade or vane and of the adjacent vane or blade.

In some embodiments, the machining of the lip includes determining an optimal dimension of a radial height of the gap as a function of a desired flow of cooling air through the gap.

DESCRIPTION OF THE DRAWINGS

Reference is now made to the accompanying figures in which.

DETAILED DESCRIPTION

Figure 1:
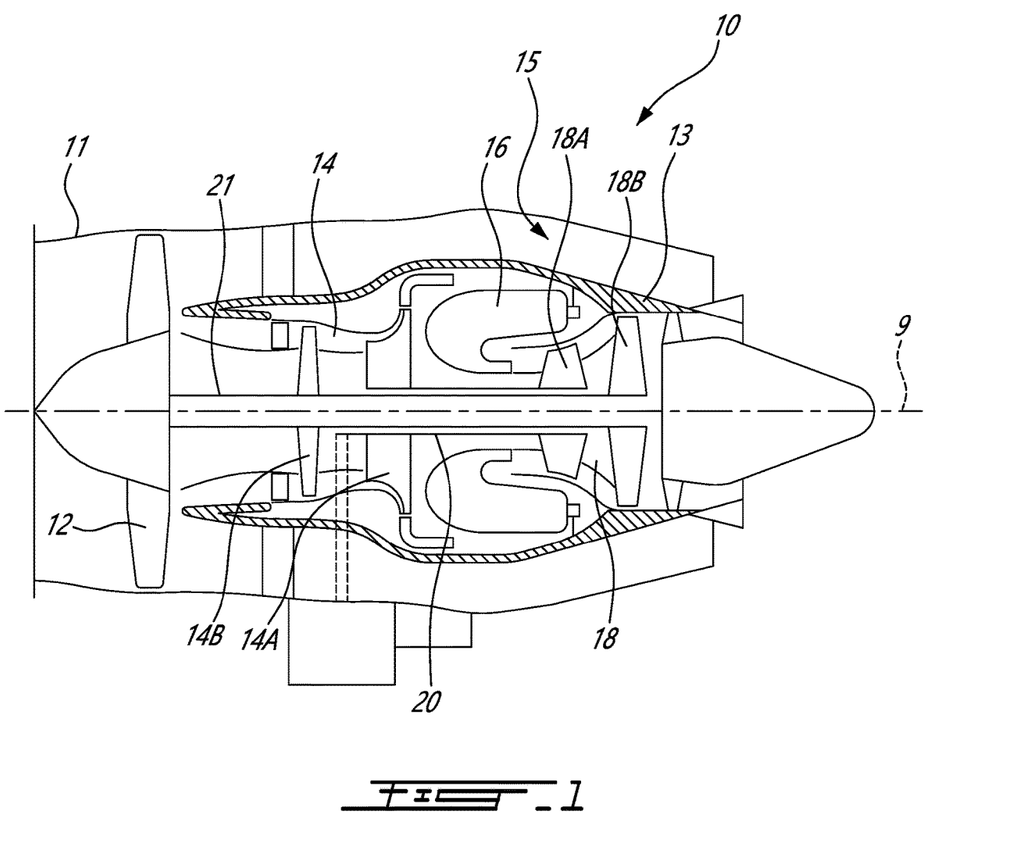
FIG. 1 is a schematic cross sectional view of a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, without departing from the scope of the present disclosure. Each of the compressor section 14 and the turbine section 18 includes rotating elements, namely compressor rotors and turbine rotors, and static or non-rotating structures, including compressor stators and turbine stators.

Figure 2:
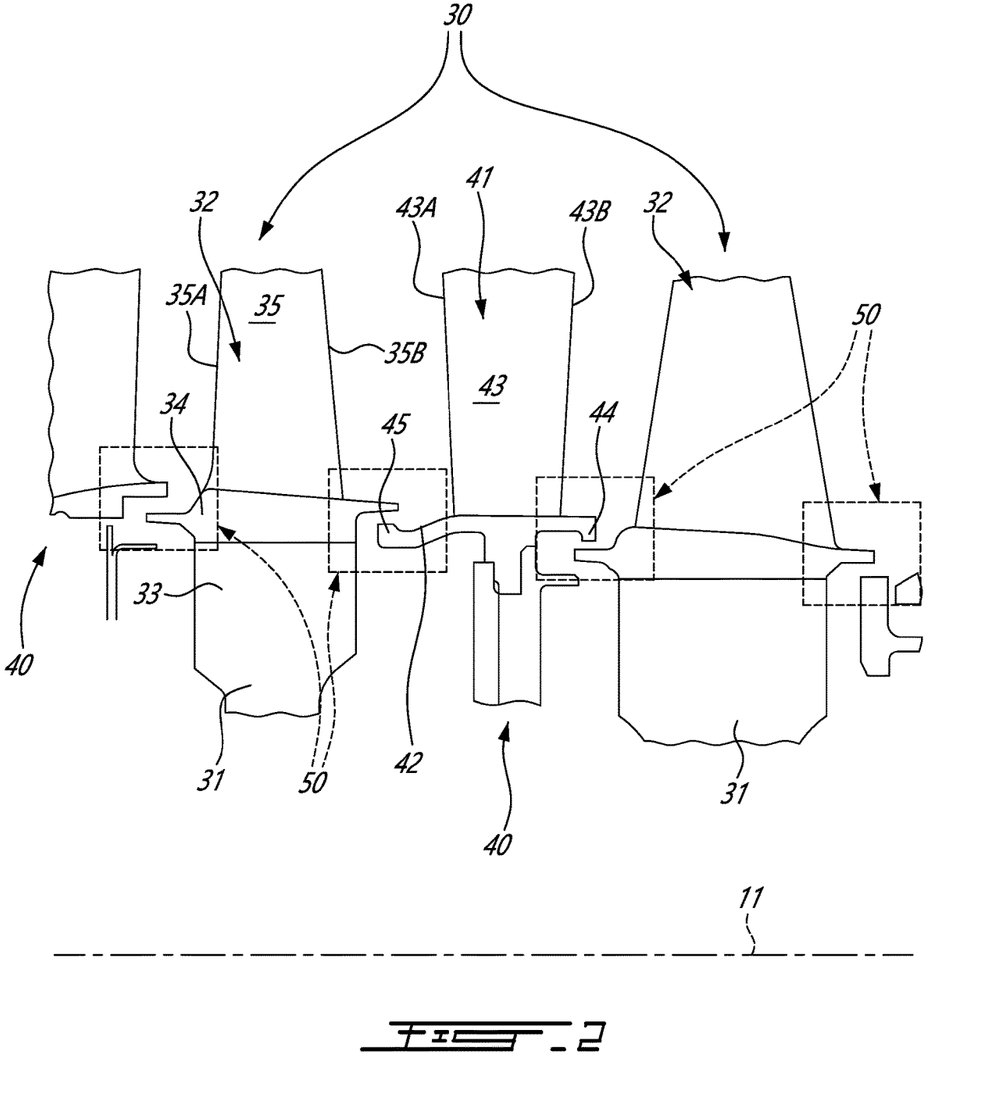
FIG. 2 is a cross-sectional view of a portion of a turbine section of the gas turbine engine of FIG. 1.

Referring now to FIG. 2, a portion of the turbine section 18 is shown in greater detail. This portion may be a portion of the high-pressure turbine 18A or of the low-pressure turbine 18B. The turbine section 18 includes a plurality of stages each may include a rotor 30 and a stator 40 adjacent the rotor 30. The rotor 30 includes a rotor disk 31 and a plurality of blades 32 mounted to a periphery of the rotor disk 31 and circumferentially distributed about the central axis 11 of the gas turbine engine 10. In some cases, the rotor 30 may be an integrally-bladed rotor in which the blades and the disk are parts of a monolithic body. Similarly, the stator 40 includes a plurality of vanes 41 circumferentially distributed about the central axis 11 of the gas turbine engine 10.

The blades 32 include a blade root 33 that is sized to be received in a correspondingly shaped slot defined in the rotor disk 31. Each of the blades 32 includes a platform 34 and an airfoil 35 protruding from the platform 34 along a direction having a radial component relative to the central axis 11. The airfoil 35 has a leading edge 35A and a trailing edge 35B downstream of the leading edge 35A relative to a flow direction in an annular gas path of the gas turbine engine 10.

The vanes 41 are secured to a casing of the gas turbine engine 10 and includes an inner shroud 42 and an outer shroud (not shown). An airfoil 43 extends from the inner shroud 42 to the outer shroud along a direction having a radial component relative to the central axis 11. The airfoil 43 has a leading edge 43A and a trailing edge 43B downstream of the leading edge 43A. The stator 40 may be a full ring. That is, the vanes 41, the inner shroud 42, and the outer shroud may be part of a monolithic single ring part. The inner and outer shrouds may extend along a full circumference and each of the airfoils 43 may extend monolithically from the inner shroud 42 to the outer shroud. In other embodiments, the stator 40 may be a segmented ring including a plurality of ring segments circumferentially distributed around the central axis 11. Each of the ring segments may include an inner shroud, an outer shroud, and one or more vanes extending from the inner shroud to the outer shroud. In some other embodiments, a full vane ring is provided with slots (e.g., 3 slots) circumferentially distributed about its circumference. These slots may be provided solely on the inner shroud. Lips may each extend circumferentially from one slot to a circumferentially adjacent slot.

Rim seals 50 are defined between the inner shrouds 42 of the vanes 41 and the platforms 34 of the blades 32. In some cases, a rim seal may be provided between the platforms 34 of the blades 32 and another non-rotating structure, such as a casing, of the gas turbine engine 10. These rim seals 50 include an axial overlap between the inner shrouds 42 and the platform 34. The disposition of the inner shrouds 42 and of the platforms 34 may form a waterfall as shown in FIG. 2. This may limit leakage of the combustion gases outside the annular gas path. As shown in FIG. 2, for each of the rim seals 50, an upstream-most one of a respective one of the inner shroud 42 and a respective one of the platforms 34 is disposed radially-outwardly of a downstream-most one of the respective one of the inner shroud 42 and the respective one of the platform 34. For instance, for the rim seal 50 located between a vane 41 located immediately downstream of a blade 32, a portion of the platform 34 of the blade 32 located downstream of the trailing edge 35B of the airfoil 35 is located radially outwardly of, and axially overlaps, a portion of the inner shroud 42 located upstream of the leading edge 43A of the airfoil 43. Stated differently, in the embodiment shown, each of the inner shroud 42 and the platforms 34 has an upstream over-hanging or cantilevered portion and a downstream over-hanging or cantilevered portion; the upstream over-hanging portions being disposed radially-inwardly of an adjacent shroud or platform and the downstream over-hanging portions are disposed radially-outwardly of an adjacent shroud of platform. This creates the waterfall or downward stairs configuration.

Figure 3:
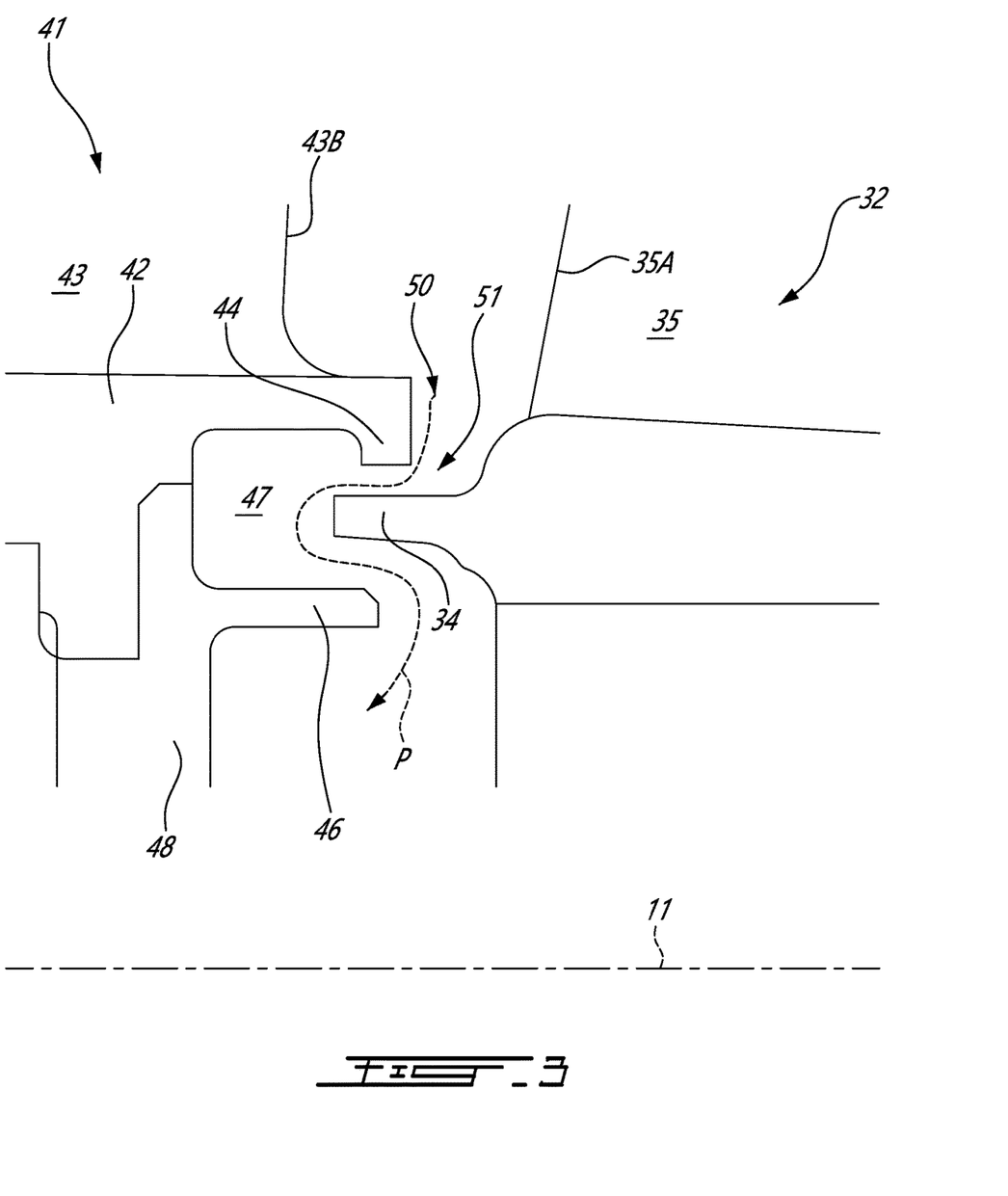
FIG. 3 is an enlarged view of a portion of FIG. 2.

Referring now to FIG. 3, the rim seal 50 defines a gap 51 extending radially relative to the central axis 11 from the platform 34 of the blade 32 to the inner shroud 42 of the vane 41. A dimension of this gap may vary with operating conditions of the gas turbine engine 10. That is, when the engine is powered off, and when the different components of the turbine section 18 are cold, the gap may have a greater dimension than when the components are hot and the engine is running. This may be caused by thermal expansion, centrifugal forces in the rotating rotors of the turbine section 18, three dimensional effects such as carcass deflections in operating conditions, and so on.

Because of these considerations, it may be difficult to design the inner shroud 42 and platforms 34 of the vanes 41 and blade 32. It may further be difficult to get to the threshold point where optimal seal performances without causing interferences between rotating and static parts is achieved. Typically, the vanes 41 and the blades 32 are casted. Once the vanes 41 are designed, moulds are manufactured and used to cast the vanes 41 and the blades 32. If, for some reasons, it is required to decrease the size of the gap 51 because too much cooling air flows through it for instance, the moulds are to be re-designed. This is an expensive process.

The vane 41 of the present disclosure may at least partially alleviate this drawback. In the embodiment shown, the inner shroud 42 of the vane 41 includes a calibration lip, which will be referred below simply as a lip 44. The lip 44, when located downstream of the trailing edge 43B of the airfoil 43 of the vane 41, as shown in FIG. 3, extends radially inwardly towards the platform 34 of the blade 32. The lip 44 may extend circumferentially all around the central axis 11. The lip 44 may therefore be annular. The lip 44 may include a plurality of lip sections circumferentially disposed around the central axis 11. This latter configuration may be used, for instance, when the stator includes a plurality of ring segments; each ring segments may have its own lip extending along a full circumferential length of said ring segment. The lip 44 may extend in a direction being solely radial. As shown in FIG. 2, the vane 41 includes a second lip 45, which is located upstream of the leading edge 43A of the airfoil 43 of the vane 41. The second lip 45 protrudes radially outwardly from the inner shroud 42 toward the platform 34 of an adjacent one of the blades 32. The second lip 45 may extend circumferentially all around the central axis 11. The second lip 45 may therefore be annular. The second lip 45 may include a plurality of lip sections circumferentially disposed around the central axis 11. This latter configuration may be used, for instance, when the stator includes a plurality of ring segments; each ring segments may have its own lip extending along a full circumferential length of said ring segment. The features described below may apply to both of the lip 44 and the second lip 45.

It will be appreciated that, in some embodiments, these calibration lips may be defined, alternatively or in combination, by the platform 34 of the blade 32. In some cases, both of the platform 34 of the blade 32 and the inner shroud 42 of the vane 41 may define calibration lip as described herein without departing from the scope of the present disclosure. The lip, which may be defined by the blade 32, may extend along a full circumferential length of the platform 34; each platform 34 may include its respective lip extending a full circumferential length of said platform 34.

The lip 44 is used to permit a calibration of the rim seal 50. That is, the lip 44 is manufactured with extra material, both radially and axially. Herein, "extra material" may be construed as more material than involved in a typical casting process. That is, a casted part typically has an outer layer and an inner layer. The outer layer defines a casted outer surface of the casted part and is in contact with the mould. The inner layer is located underneath the outer layer. This extra material for the casting may ease the casting process due to a viscosity of metal in fusion. A typical thickness of this outer layer may be about 0.03 inch. In some cases, machining of the casted part is performed when precise sizing is required. In the present case, a 0.030 inch layer is added to accommodate for the casted surface variation so that the surface may be fully machined to a constant dimension. At the manufacturing stage, it may be preferable to have a continuous machining process. In other words, without an extra layer, the process of machining with a lathe, or other suitable tool, may be affected by an interrupted cut. Hence, a casted part may be manufactured with extra matter because it is assumed that further machining will be done on the casted part such that the exposed outer face of the final part is defined by the inner layer, and not by the outer layer. In the present case, the lip 44, which is casted, further to include extra matter designed to be removed to expose the inner layer, includes an extra portion of inner layer to allow some resizing of the lip 44 when need be as will be discussed below. Stated differently, a thickness of the outer layer may remain the same as a typical casting process, but a greater thickness of the inner layer is provided at the lip 44 to provide a margin to machine the lip 44 at a suitable radial height as will be explained below.

Following analysis and testing, the lip 44 may be machined to an optimal or desired dimension to ensure proper sealing of the rim seal 50 and avoid rubbing between the platform 34 and the inner shroud 42. This may allow the optimisation of the distribution of the cooling air injected in the gaspath via the rim seal 50 to avoid hot gas ingestion. This may also avoid undesired rubbing between the components. More detail about the manufacturing of the lip 44 are provided below with reference to FIG. 5. Moreover, in some embodiments, each of the lip 44 may be re-sized to optimize the distribution of the cooling air across the different rim seals 50.

Still referring to FIG. 3, in the embodiment shown, a "fishmouth" configuration may be provided around the platform 34 of the blade 32. This "fishmouth" configuration includes the inner shroud 42 and the lip 44 and a lower protrusion 46 that extends axially relative to the central axis 11 and that axially overlaps the platform 34. Hence, a portion of the platforms 34 of the blades 32 are contained within a cavity 47 defined radially between the lower protrusion 46 and the inner shroud 42. This creates a tortuous flow path, denoted by arrow P in FIG. 3, that may contribute in limiting hot gas ingestion from the gas path. In the embodiment shown, the lower protrusion 46 is defined by a plate 48 that is secured (e.g., fastened) to the stator 40. This configuration may be however omitted without departing from the scope of the present disclosure.

Figure 4:
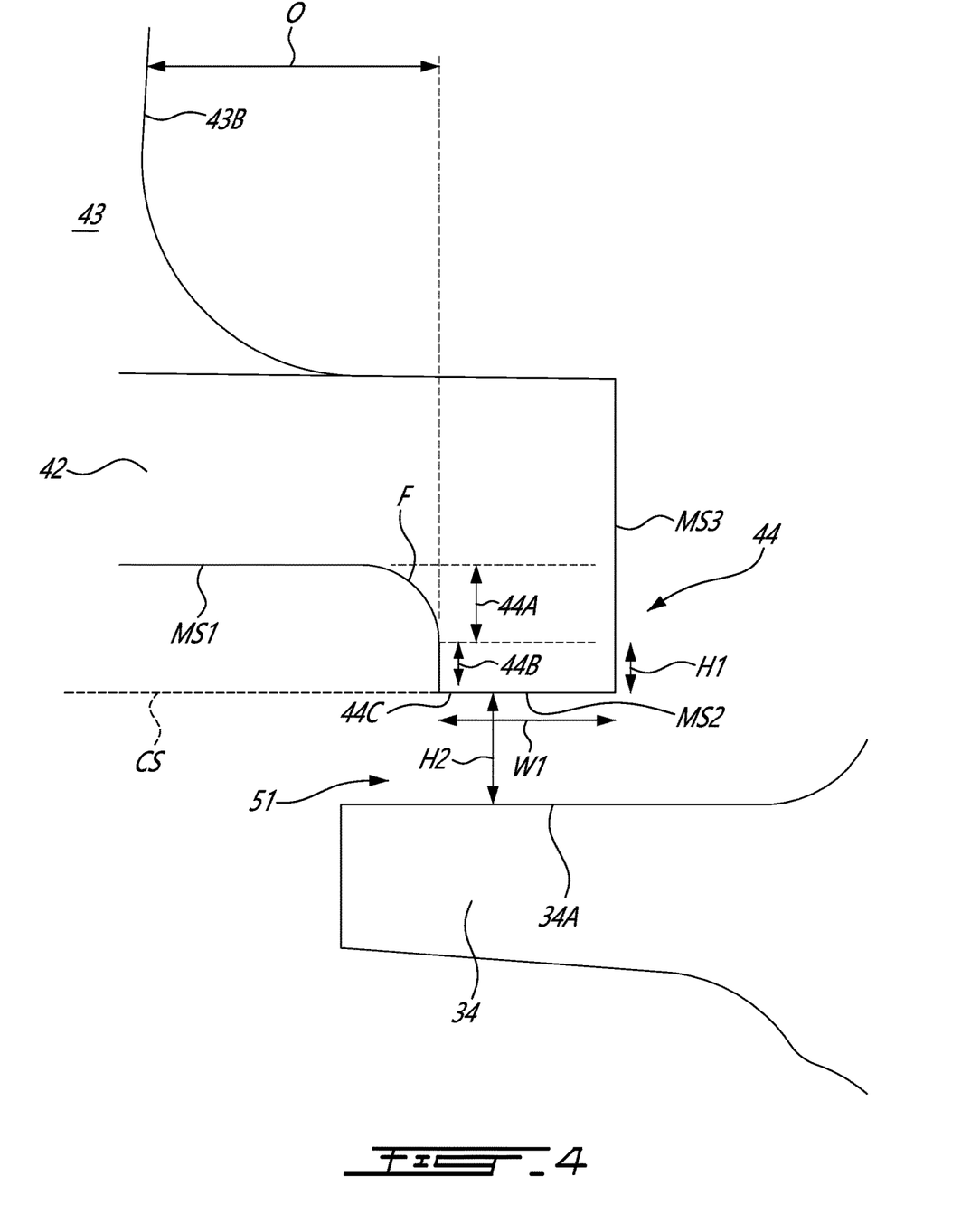
FIG. 4 is an enlarged view of a portion of FIG. 3.

Referring to FIG. 4, the lip 44 is described in more detail. The description below may apply to the second lip 45 and to any lip that may be defined by the platforms 34 of the blades 32. In the embodiment shown, once the vane 41 is casted, the lip 44 may not be formed. Hence, the lip 44 may be formed by machining a casted surface CS, which is depicted with a dashed line on FIG. 4. The casted surface CS may be machined to create a groove and creating the lip 44. This operation creates a first machined surface MS1. The machining of the casted surface CS may be made with a lathe. A shape of the lip 44 is refined by machining the casted surfaces that defines the lip 44. The lip 44 is then defined by a second machined surface MS2 and a third machined surface MS3. The second machined surface MS2 faces the platform 34 of the blade 32. The third machined surface MS3 faces an axial direction relative to the central axis 11. A fillet F may define a junction between the lip 44 and the first machined surface MS1. The second machined surface MS2 and the third machined surface MS3 may be perpendicular to one another. In the present embodiment, a machined surface may have a surface roughness less than that of a casted surface.

In the embodiment shown, the lip 44 has a base section 44A, which includes the fillet F, and a tip section 44B. The base section 44A extends from the first machined surface MS1 to the tip section 44B. The tip section 44B extends from the base section 44A to a tip 44C of the lip 44. The tip section 44B may extend in a direction being solely radial relative to the central axis 11. The tip section 44B has an axial width W1 taken along the central axis 11 that is constant along its radial height H1. Therefore, machining the tip section 44B to reduce its radial height H1 to achieve proper sealing may not impair an axial dimension of the gap 51. Moreover, an end of the base section 44A of the lip 44 may be axially aligned with the tip 44C of the lip such that the machining of the lip 44 to vary the radial height H1 of the base section 44A of the lip 44 does not change an axial position of the gap 51 in relationship to the platform 34 of the blade 32. The tip section 44B may therefore be considered as the adjustment feature of the lip 44 since it may be machined to any suitable radial height H1 to achieve proper sealing of the rim seal 50 and maintain the gap 51 during all flight phases of the gas turbine engine 10. In the embodiment shown, the tip 44C of the lip 44, which defines the second machined surface MS2, is an annular face that faces a direction having a radial component relative to the central axis 11. This annular face may be parallel to a face 34A of the platform 34.

In some embodiments, the axial width W1 of the lip 44 is about 0.05 inch. The height H2 of the gap 51 may range from 0.05 to 0.12 inch. Corners of the second machined surface MS2 may define chamfers, or break-edges. Dimension of these chamfers may range from 0.005 to 0.03 inch. Dimension of these chamfers is selected to avoid the lip 44 to define a sharp edge at its center. In the embodiment shown, the axial width W1 of the lip 44 is about 0.07 inch with chamfers of at most 0.01 inch.

As shown in FIG. 4, there is an axial offset O between the trailing edge 43B of the airfoil 43 of the vane 41 and the tip section 44B of the lip 44. In other words, the lip 44 may be axially offset from the trailing edge 43B. The lip 44 may be located downstream of the trailing edge 43B of the airfoil 43 of the vane 41; the lip 44 protruding radially inwardly from the inner shroud 42. In this case, that is, when the lip 44 is located downstream of the trailing edge 43B, the lip 44 protrudes radially inwardly toward the platform 34. Alternatively, if the lip 44 were located upstream of the leading edge 43B of the airfoil 43 of the vane 41, this lip 44 would protrude radially outwardly from the inner shroud 42 toward the platform 34. This may be seen in FIG. 2 when looking at the second lip 45. This second lip 45 may be axially offset from the leading edge 43A of the airfoil 43 of the vane 41. This axial offset between the lip and second lip and the trailing and leading edges may ensure that the lips does not affect aero-structure interaction of the flow with the airfoil 43 during use of the gas turbine engine 10. In the embodiment shown, a downstream most location of a fillet defined at the trailing edge 43B of the airfoil 43 of the vane 41 is axially aligned with an upstream-most location of the filet F at the junction between the lip 44 and the first machined surface MS1.

It will be appreciated that the lip 44 is free of an abradable material. That is, the lip 44 may be a monolithic part of the vane 41 and may be made of the same material than a remainder of the vane 41. This material may be, for instance, Inconel™ or any other suitable material for use in turbine sections of gas turbine engines. The adjustment feature of the lip 44 is made, in the present case, by a manufacturing operation (e.g., by lathe) and is not a consequence of the lip wearing away during use of the gas turbine engine as would be the case if abradable material were used. Hence, the second machined surface MS2 may be defined by the same material as a remainder of the inner shroud 42 of the vane 41.

Figure 5:
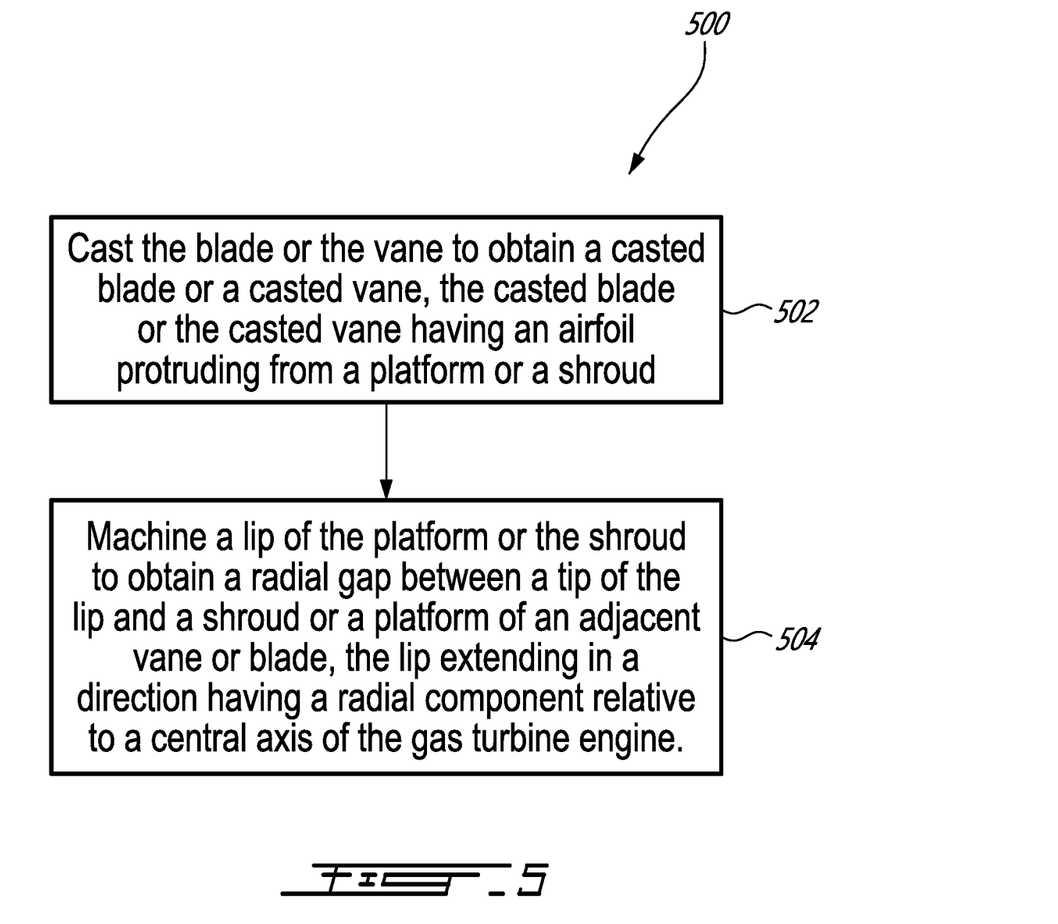
FIG. 5 is a flow chart illustrating steps of manufacturing a rotor or a stator of the gas turbine engine of FIG. 1.

Referring now to FIG. 5, a method of manufacturing the vane 41 is shown at 500. It will be appreciated that this method may be used to manufacture the blade 32.

The method 500 includes casting the vane 41 to obtain a casted vane having the airfoil 43 protruding from the inner shroud 42 at 502; and machining the lip 44 of the inner shroud 42 obtain the radial gap 51 between the tip of the lip 44 the platform 34 the adjacent blade 32 at 504.

In the embodiment shown, the method 500 includes machining the casted vane to define the lip 44. That is, the shroud 42 of the casted vane may not define the lip 44. As explained above, the shroud 42 may be machined, with a lathe for instance, to create a groove defined by the first machined surface MS1 (FIG. 4) and to define the lip 44. In some cases, the casted vane is coated with a wear-resistant coating, a thermal-barrier coating, or any suitable coating. This coating may include, for instance, oxidation or sulfidation resistant coatings. The machining of the lip 44 may be performed after the coating step. The lip 44 may not be re-coated after the machining at 504. In the present case, only the tip section 44B (FIG. 4) of the lip 44 is machined to ensure a constant axial width W1 of the gap 51 and of the lip 44.

In the embodiment shown, the machining of the lip 44 includes determining an optimal dimension of the radial height H2 of the gap 51 and the radial height H1 of the lip 44 is decreased until the gap 51 has the optimal dimension. Determining the optimal dimension of the radial height of the gap 51 may include theoretically determining the optimal radial height using thermal expansion data of the different components of the turbine section 18 of the gas turbine engine 10 and using data on manufacturing tolerances of these different components. In some embodiments, numerically simulations are performed to predict thermal-induced deformations and stress-induced deformations of the different components of the turbine section 18 (e.g., blade 32, vane 41, etc). Based on the results of these numerical simulations, the optimal height of the gap 51, and the optimal radial height of the lip 44 may be derived. The machining of the lip may include determining an optimal dimension of a radial height of the gap as a function of a desired flow of cooling air through the gap.

In some cases, the vane 41 may be casted with a shroud 42 having a given thickness such that a maximum radial height of the lip 44 that may be obtained may not exceed a theoretical limit beyond which rubbing between the platforms 34 and the lip 44 occurs. This theoretical limit may be obtained as explained above by taking into consideration the thermal expansion and manufacturing tolerance data of the different components.

The determining of the optimal size of the gap 51 from these simulations may take into consideration the secondary air flow used for cooling down the different components of the turbine section 18. In some cases, test may show that too little air flows through a respective gap 51. The corresponding lip may then be machined to decrease its radial height to increase a flow rate via the gap 51.

The disclosed vane or blade having the lip may provide more flexibility in development phases of a gas turbine engine, which may save costs since the mould used for the casting may not need to be re-designed. In other words, the mould may be designed with a maximum attainable lip radial height, which corresponds to a limit beyond which rubbing may occur. If, during further simulations or actual testing, rubbing is predicted or observed, then the lip may be further machined to prevent this rubbing without having to modify the mould. This may provide costs savings. Moreover, if the quantity of cooling air has to be varied through certain of the rim seals 50, the lip may be machined to vary its radial height to provide calibration of the cooling air through the different rim seals. The casted surface before the machining of the lip may include about 0.03 inch of excess material. Hence, the casted lip may be 0.03 inch greater than this theoretical limit.

The disclosed calibration lip may provide greater flexibility for air system calibration during development; and may not significantly impact part stresses or weight. Cost savings and a greater granularity in the optimization of the secondary air flow may be achieved via the calibration lip. Performance gains may thus be achieved.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A turbine section comprising:
   a rotor rotatable about a central axis, the rotor having blades each protruding radially outwardly from a platform relative to the central axis;
   a stator having vanes each protruding radially outwardly from a shroud;
   a rim seal between the platform and the shroud, the rim seal having:
      an axial overlap between the platform and the shroud, and
      a lip protruding in a direction having a radial component relative to the central axis from one of the platform and the shroud toward the other of the platform and the shroud, the lip axially overlapping the other of the platform and the shroud,
   the lip having a radial height such that a radial gap remains between the lip and the other of the platform and the shroud when the turbine section is in operation, the lip having a face oriented radially toward the other of the platform and the shroud, the face being a machined surface having a surface roughness of less than that of a surface of the blades.

2. The turbine section of claim 1, wherein the lip includes a base section protruding from the one of the platform and the shroud and a tip section protruding from the base section to a tip of the lip, an axial width of the tip section being constant from an end of the base section to the tip of the lip.

3. The turbine section of claim 2, wherein the end of the base section is axially aligned with the tip of the lip.

4. The turbine section of claim 3, wherein the tip of the lip defines an annular face facing a direction having a radial component relative to the central axis, the annular face parallel to a face of the other of the platform and the shroud.

5. The turbine section of claim 4, wherein the one of the platform and the shroud defines an axial end face perpendicular to the annular face of the lip.

6. The turbine section of claim 1, wherein the lip is free of an abradable material.

7. The turbine section of claim 1, wherein the lip protrudes from a distal end of the one of the platform and the shroud.

8. The turbine section of claim 1, wherein the one of the platform and the shroud is the shroud, the lip defined by the shroud.

9. The turbine section of claim 1, wherein the lip is located downstream of a trailing edge of an airfoil protruding from the one of the platform and the shroud, the lip protruding radially inwardly from the one of the platform and the shroud.

10. The turbine section of claim 9, wherein the lip is axially offset from the trailing edge relative to the central axis.

11. The turbine section of claim 1, wherein the lip is located upstream of a leading edge of the one of the platform and the shroud, the lip protruding radially outwardly from the one of the platform and the shroud.

12. The turbine section of claim 11, wherein the lip is axially offset from the leading edge relative to the central axis.

13. The turbine section of claim 1, wherein the one of the platform and the shroud includes a second lip, the lip and the second lip located respectively downstream and upstream of an airfoil protruding from the one of the platform and the shroud.

* * * * *